(12) United States Patent
Trainin

(10) Patent No.: US 6,813,279 B1
(45) Date of Patent: Nov. 2, 2004

(54) ETHERNET TO ATM CONVERTER

(75) Inventor: Solomon B. Trainin, Haifa (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/474,480

(22) Filed: Dec. 29, 1999

(51) Int. Cl.[7] .................................................. H04J 3/22
(52) U.S. Cl. ........................................ 370/466; 370/428
(58) Field of Search ........................... 370/466, 395.52, 370/395.6, 473, 474, 428

(56) References Cited

U.S. PATENT DOCUMENTS

| | | | |
|---|---|---|---|
| 5,420,858 A | | 5/1995 | Marshall et al. |
| 5,457,681 A | * | 10/1995 | Gaddis et al. ............... 370/466 |
| 5,617,419 A | * | 4/1997 | Christensen et al. ........ 370/471 |
| 5,815,501 A | | 9/1998 | Gaddis et al. |
| 5,818,842 A | * | 10/1998 | Burwell et al. ............. 370/465 |
| 5,910,954 A | * | 6/1999 | Bronstein et al. ........... 370/466 |
| 5,946,313 A | * | 8/1999 | Allan et al. ................. 370/401 |
| 5,949,785 A | * | 9/1999 | Beasley ....................... 370/466 |
| 6,249,528 B1 | * | 6/2001 | Kothary ....................... 370/466 |
| 6,327,249 B1 | * | 12/2001 | Cookman et al. ........... 370/235 |
| 6,463,063 B1 | * | 10/2002 | Bianchini et al. ......... 370/395.53 |

* cited by examiner

Primary Examiner—Kwang Bin Yao
Assistant Examiner—Keith M. George
(74) Attorney, Agent, or Firm—Blakely, Sokoloff, Taylor & Zafman LLP

(57) ABSTRACT

An Ethernet-to-ATM and ATM-to-Ethernet converter is coupled between an Ethernet physical layer and an ATM physical layer. In an Ethernet-to-ATM communication path, the converter includes a start frame delimiter unit coupled to an output of an Ethernet physical interface. The start frame delimiter unit is coupled to a first buffer and to a cell separation and threshold logic unit. The first buffer is in turn coupled to an ATM physical interface. Software in a personal computer can format a frame that is sent along the Ethernet-to-ATM communication path. The frame is prepared as an Ethernet-type frame with a data field having one or more cells formatted similarly to ATM cells. In an ATM-to-Ethernet communication path of the converter, a second buffer is coupled to the ATM physical interface. A preamble generation logic unit is coupled to the second buffer and to the Ethernet physical interface. An ATM cell received from the ATM physical interface is held in the second buffer, and a preamble is added to the ATM cell to transform it into an Ethernet-type frame that is subsequently sent to the Ethernet physical interface.

21 Claims, 4 Drawing Sheets

ETHERNET TO ATM CONVERTER

BACKGROUND OF THE INVENTION

1. Field of the Invention

The invention relates generally to network interconnection devices, and in particular, to devices that provide interconnection between an Asynchronous Transfer Mode (ATM) network and nodes of a Local Area Network (LAN).

2. Background Information

Personal computers (PCs), servers, printers, and other such devices (sometimes referred to as "nodes") are commonly connected together as a network or LAN. LANs typically operate according to Ethernet standards and protocols. With Ethernet technology, all nodes in the LAN share the bandwidth of the communication medium (e.g., twisted pair or coaxial cables) that connects the nodes together. All nodes in the LAN are reached anytime there is a single transmission of data in the form of "Ethernet" frames having source and destination addresses. The node having the destination addresses processes the received transmission. Ethernet networks are known as "connectionless" networks because by using source and destination addresses, communication can occur without the need to first establish a connection and without immediate acknowledgement of receipt.

PCs and other devices are connected to the LAN by various Ethernet hardware interfaces installed in or coupled to these devices. For example, many PCs are equipped with Network Interface Cards (NIC), such as the commonly used Ethernet NIC card and various Ethernet controller units. An Ethernet LAN often uses carrier sense multiple access with collision detection (CSMA/CD) methods, where different nodes listen for transmissions in progress in the communication medium before beginning to transmit. However, CSMA/CD methods sometimes cannot limit the maximum access time to the communication medium, which can result in the denial or delay of access to the communication medium to one or more nodes.

While response time is sufficient for many applications, the increasing presence of multimedia video and audio has increased the need for networks that can provide guaranteed access time. Ethernet systems that attempt to handle this type of data often get bottlenecked. Therefore, it has been proposed to connect LANs to ATM networks that operate at 155 Mbps and higher. ATM networks further provide a rich environment having numerous types of traffic classes and the ability to multiplex many data streams with different handling requirements. The key feature of an ATM networks is that data is segmented into fixed lengths of data called "cells." ATM networks are known as "connection oriented transmission" networks because rather than using source and destination addresses, connection is established by signaling. A connection to a remote-end station is signaled/requested, and upon connection set-up, virtual circuit identifier (VCI) and virtual path identifier (VPI) is provided to headers of the ATM cells that are transmitted.

While it may be advantageous for LANs to connect to ATM networks because of the attractive features provided by ATM networks, doing so is often impractical because of the high costs of ATM interfaces required to connect LANs and/or individual PCs to ATM networks. Also, while it may be possible to build ATM interfaces and switches having lower speeds that can accommodate Ethernet speeds, such a solution is costly because it would require replacement of existing Ethernet physical interfaces currently in use by or installed in many LANs and their nodes. Such high costs are difficult to justify for common PCs and workstations. Accordingly, there is a need to be able to connect nodes, such as PCs equipped with Ethernet NICs, to ATM networks without having to replace existing hardware interfaces.

SUMMARY OF THE INVENTION

One aspect of the invention provides an apparatus that includes a first buffer having an input that can be coupled to a network interface of a first type, with the network interface of the first type operating at a first data rate. An output of the first buffer can be coupled to a network interface of a second type that operates at a second data rate faster than the first data rate. A separation unit is coupled to the first buffer, and a second buffer has an output that can be coupled to the network interface of the first type and an input that can be coupled to the network interface of the second type. The second buffer is sized larger than the first buffer. The first buffer holds at least a portion of a first frame received from the network interface of the first type and the separation unit sends the portion of the first frame to the network interface of the second type at a data rate corresponding to the second data rate. The second buffer holds a second frame received from the network interface of the second type and sends the second frame to the network interface of the first type at a data rate corresponding to the first data rate.

BRIEF DESCRIPTION OF DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

An embodiment of an apparatus and method for communicating between a terminal having a first type of communication interface and a network having a second type of communication interface is described in detail herein. For example, the embodiments of the invention can be used to communicate from a PC having an Ethernet interface to an ATM network, and vice versa. In the following description, numerous specific details are provided, such as the description of frames shown in FIGS. 4 and 5, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Figure 1:
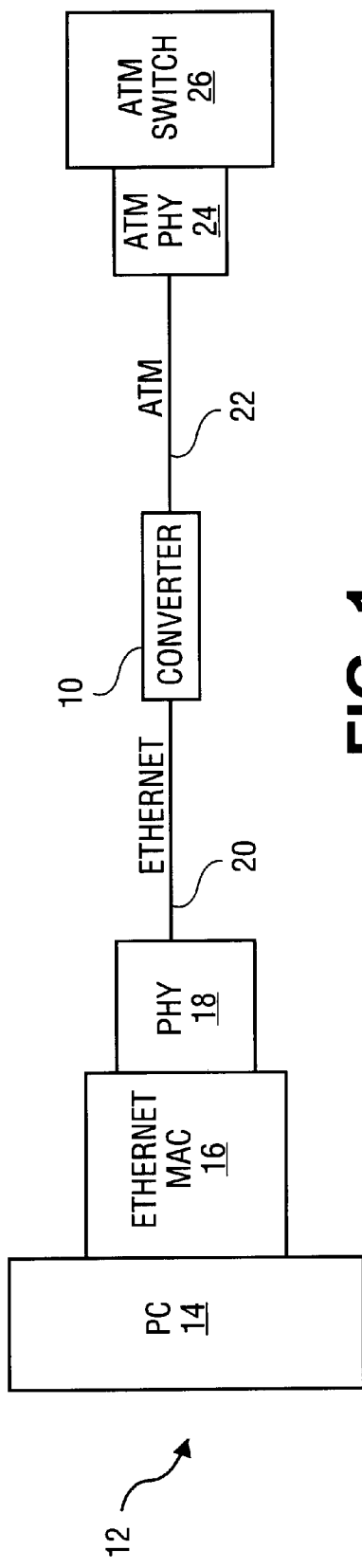
FIG. 1 shows a segment of a network that can implement an embodiment of the invention.

Referring first to FIG. 1, shown at 10 is a converter according to an embodiment of the invention. The converter 10 is connected as part of a network segment 12, which can form part of a LAN. The network segment 12 includes a node or network device that can have a microprocessor, such as a PC 14 having an Ethernet Media Access Control (MAC) interface 16. The MAC interface 16 operates at the lower half of the data link layer of the seven-layer International Organization for Standardization/Open Systems Interconnect (ISO/OSI) model, and deals with network access and collision detection. The PC 14 further includes an Ethernet physical interface 18 that operates at the physical layer of the ISO/OSI model, and deals with hardware connections. The Ethernet physical interface 18 can be in turn connected to a port of the converter 10 by a dedicated Ethernet link 20.

In an embodiment of the invention, the Ethernet MAC interface 16, Ethernet physical interface 18, and Ethernet link 20 can utilize Fast Ethernet (sometimes referred to as 100BASE-T) speeds of 100 Mbps. It is also possible to provide embodiments that use standard Ethernet (sometimes referred to as 10BASE-T) speeds of 10 Mbps. Other communication formats besides Ethernet may also be used in some embodiments. Accordingly, the invention is not limited by the specific type of communication format or by data speed.

The other port of the converter 10 is connected by an ATM link 22 to an ATM physical interface 24. As is known in the art, ATM communications can operate at speeds of 155 Mbps and above. The ATM physical interface 24 is associated with the physical layer of the ATM Protocol Reference Model, and deals with hardware connections. The ATM physical interface 24 is coupled to a port of an ATM switch 26. The ATM switch 26 can have one or more of these ports associated with respective ATM physical interfaces 24. Each of these ports can be dedicated with 155 Mbps of bandwidth.

The ATM switch 26 is then coupled to an ATM network (not shown). This ATM network can include other ATM switches and/or other types of ATM devices. LANs, other types of networks, PCs, network devices, printers, servers, etc. can be coupled to the ATM network. Hence, the PC 14 can communicate with a wide variety of remote nodes via the ATM network. Additionally, while ATM interfaces and networks are shown and described herein, it is also possible to use principles of the present invention on a Synchronous Optical Network (SONET) or other kinds of networks.

Figure 2:
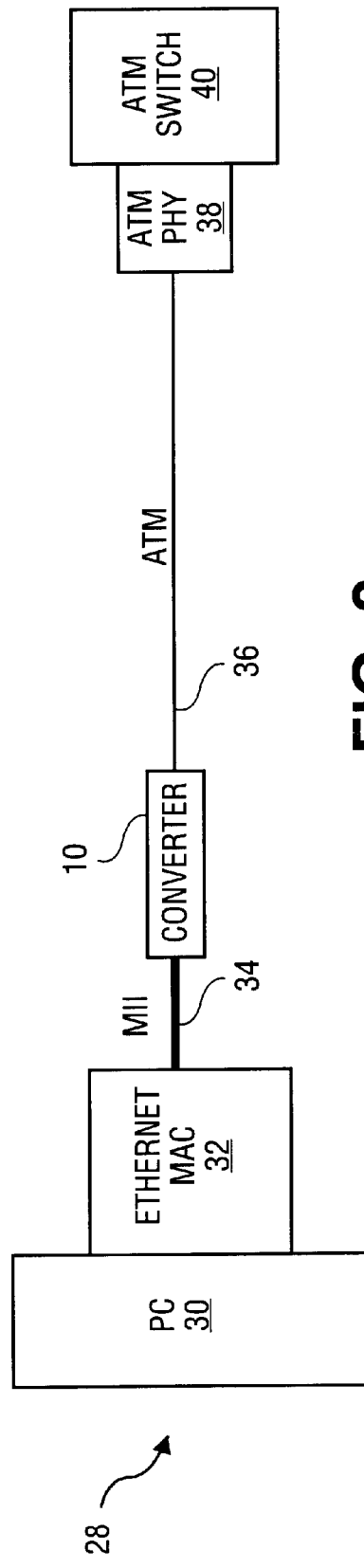
FIG. 2 shows another segment of a network that can implement an embodiment of the invention.

FIG. 2 illustrates another network segment 28. The network segment 28 is similar to the network segment 12 shown in FIG. 1 in that it includes a PC 30, an Ethernet MAC interface 32, the converter 10, an ATM link 36, an ATM physical interface 38, and an ATM switch 38. However, the Ethernet physical interface 18 of FIG. 1 is replaced by a Media Independent Interface (MII) unit 34. The MII unit 34 connects the MAC layer to the converter 10, and further provides a dedicated link (shown symbolically as part of the MII unit 34 in FIG. 2).

In some embodiments, both of the network segments 12 and 28 can be connected to the same ATM switch 26 or 40. In other embodiments, each network segment 12 and 28 is independently connected to the respective ATM switches 26 and 40. The ATM switches 26 and 40 can be coupled to each other. It is also possible to provide a single PC that has both MII and Ethernet interfaces of FIGS. 1 and 2.

The various links shown in FIGS. 1 and 2, such as the Ethernet link 20 and the ATM link 22, can be coaxial cable, shielded twisted pair, unshielded twisted pair, radio frequency links, microwave links, cellular links, optical links, etc. Therefore, the invention is not limited by the specific type of communication media used in the various links. Further, for the network segment 12 of FIG. 1, the converter 10 can be installed near the PC 14, near the ATM switch 26, or anywhere in between. For the network segment 28 shown in FIG. 2 that uses the MII unit/interface 34, the converter 10 can be installed close to the PC 30.

Figure 3:
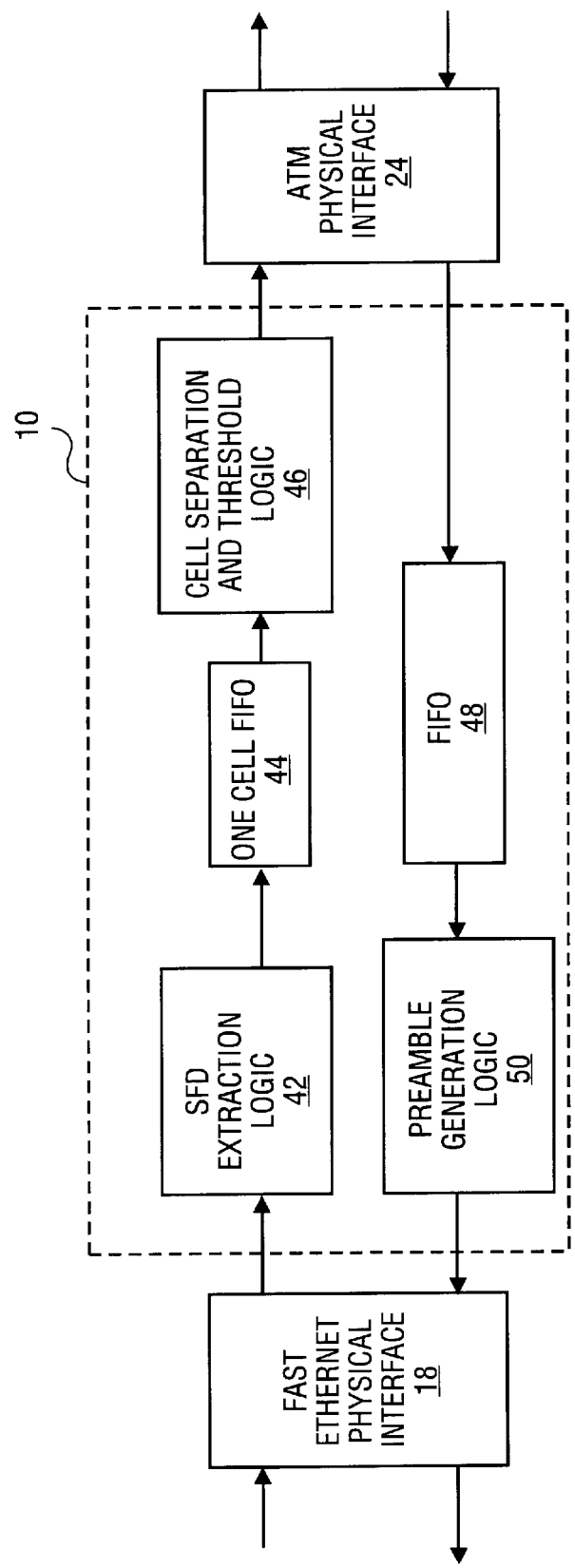
FIG. 3 shows an embodiment of a converter according to the invention that can be implemented in the network segment shown in FIG. 1 or 2.

According to an embodiment of the invention, the converter 10 substitutes the physical level(s) of the Ethernet interface 18 and/or MII interface 34 with the physical level of the ATM interfaces 24 and 38, respectively, and vice versa. FIG. 3 shows an embodiment of the converter 10 that can be used in the network segment 12 of FIG. 1. For simplicity of explanation, embodiment of the converter 10 shown in FIG. 3 for the network segment 12 will be described herein first. An embodiment of the converter 10 for the network segment 28 of FIG. 2 is explained later with reference to FIG. 6, and operates according to similar principles.

The converter 10 shown in FIG. 3 has two separate paths for Ethernet-to-ATM and ATM-to-Ethernet communications. Components of the Ethernet-to-ATM communication path in the converter 10 include a start frame delimiter (SFD) unit 42 coupled to the Ethernet physical interface 18 and a first-in-first-out (FIFO) buffer 44 coupled to the SFD unit 42. The SFD unit 42 has logic circuitry that can detect and extract one or more binary patterns in an Ethernet-type frame that delimits/represents the start the frame.

The FIFO buffer 44 can be sufficiently sized to store the equivalent of one ATM cell. One ATM cell is 53 bytes (or 53 octets) long (if a format of eight bits per byte is used). Five bytes of the ATM cell are used for header information and VCI/VPI information that identifies the ATM channel that the cell is to travel. The FIFO buffer 44 helps to synchronize Ethernet bit rates (e.g., 100 Mbps) with ATM bit rates (e.g., 155 Mbps). That is, and as will be explained in further detail below, the buffering allows a smooth transfer of cells from the Ethernet physical interface 18 to the ATM physical interface 24.

The Ethernet-to-ATM communication path of the converter 10 also includes an ATM cell separation and threshold logic unit 46 coupled in parallel to (or in series with) the FIFO buffer 44. The ATM cell separation and threshold logic unit 46 controls the transfer of ATM cells from the FIFO buffer 44 to the ATM physical interface 24.

The ATM-to-Ethernet communication path of the converter 10 includes a FIFO buffer 48 coupled to the ATM physical interface 24, and is sufficiently sized to buffer dozens of ATM cells, for example. Like the FIFO buffer 44 in the Ethernet-to-ATM communication path, the FIFO buffer 48 in the ATM-to-Ethernet communication path functions to synchronize ATM bit rates with Ethernet bit rates. The output of the FIFO buffer 50 is coupled to a preamble generation logic unit 50, which is in turn coupled to the Ethernet physical interface 18.

Figure 4:
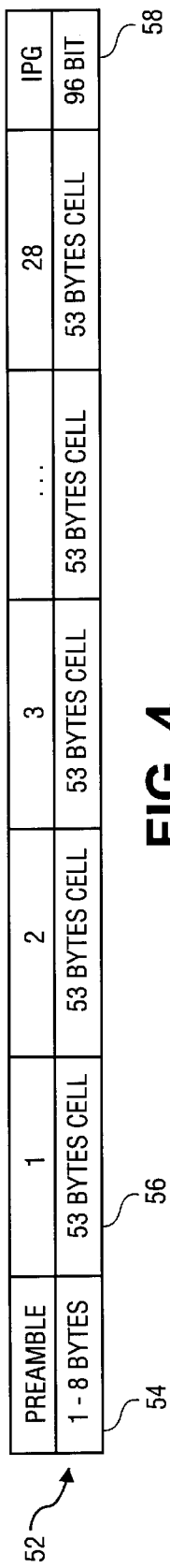
FIG. 4 shows an embodiment of a first type of frame that can be processed by the converter shown in FIG. 3.

The manner in which the Ethernet-to-ATM communication path of the converter 10 shown in FIGS. 1–3 can be understood by referring next to FIG. 4. FIG. 4 shows an embodiment of a frame (or packet) 52 that can be prepared or configured by communication software or other instructions stored in a computer-readable or machine readable medium (e.g., a random access memory or read only memory) utilized by the PCs 14 and 30.

The frame 52 is similar to conventional Ethernet frames, but there are some significant differences, and hence it is not a "true" Ethernet frame. The frame 52 is similar in that it comprises a preamble 54 (1–8 bytes long), a data field 56 (up to 1500 bytes long), and an interpacket gap (IPG) 58 (96 bits long). The preamble 54 includes the SFD bit(s) that are detected and extracted by the SFD unit 42. The IPG 58 is sometimes synonymously or analogously referred to as "interframe gap" (IFG) or "interframe slot" (IFS), and simply represents idle time between the end of the frame 52 and the beginning of another frame.

The frame 52 differs from conventional Ethernet frames in that the frame 52 does not have MAC source and destination address fields, a type/length field, and a cyclic redundancy check or other error fields. The absence of these fields decreases the length of the frame 52, thereby resulting in an overall increase in the amount of data that can go through the Ethernet link 20 per second (e.g., an increase in its throughput). Further, the frame 52 divides or defines the data field 56 into one or more individual 53-byte cells corresponding to the size of individual ATM cells. Thus, a frame 52 that comprises 28 cells that are each 53-bytes long can have 1484 bytes plus a total overhead of 8 bytes for the preamble 54.

In operation, the frame 52 is prepared by the communication software of the PC 14 such that it is in the format shown in FIG. 4, and then the frame 52 is sent from the Ethernet physical interface 18 to the SFD unit 42. The SFD unit 42 detects the SFD bits in the preamble 54 of the frame 52, thereby signaling the arrival of the 53-byte cells within the data field 56. Subsequently, the frame 52 passes through the FIFO buffer 44. Because the FIFO buffer 44 is sized to store just a single 53-byte cell at a time, the entire frame 52 does not fit in the FIFO buffer 44 at one time. That is, while earlier portions of the frame 52 are exiting the FIFO buffer 44, its later portions are still entering or waiting to enter. The ATM cell separation and threshold logic unit 46 disassembles the frame 52 into individual 53-byte packets and sends those packets individually and separately to the ATM physical interface 24.

While the frame 52 passes through the FIFO buffer 44, the ATM cell separation and threshold logic unit 46 according to an embodiment of the invention counts the number of bytes entering the FIFO buffer 44. In this embodiment, a predefined threshold is established, and the ATM cell separation and threshold logic unit 46 delays transmission of the 53-byte cells to the ATM physical interface 24 until the requisite number of bytes has been counted. This delay helps to prevent underruns in cell transfers while too few bytes are entering the FIFO buffer 44. The bytes are essentially "held in abeyance" in the converter 10 until there is a sufficient number of bytes available for smooth transfer of cells to the ATM physical interface 24.

As stated above, communication software in the PCs 14 and 30 prepares the frame 52 according to the format shown in FIG. 4. Because dedicated Ethernet links 20 and 34 are used and because the ATM switches 26 and 40 dedicate a channel for each of its ports, no MAC or Ethernet addresses need be contained within the frame 52. The VCI/VPI information contained in each of the 53-byte cells provide the necessary information to direct the frame 52 from the PCs 14 and 30 to any node that is part of the ATM network. In other embodiments, Internet Protocol (IP) addressing can be included in the ATM cell(s) or payload to allow delivery of the message to any node that is not part of the ATM network.

Figure 5:
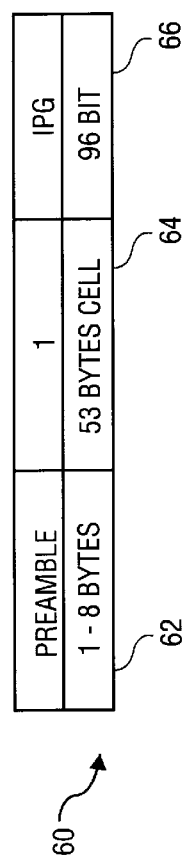
FIG. 5 shows an embodiment of a second type of frame that can be processed by the converter shown in FIG. 3.

The manner of transmission of a frame 60 in the ATM-to-Ethernet communication path of the converter 10 will now be described with reference to FIGS. 3 and 5. ATM cells 64 having a length of 53 bytes and that are sent from the ATM physical interface 24 are received in the FIFO buffer 48. Because the FIFO buffer 48 is larger than the FIFO buffer 44, the FIFO buffer can hold several ATM cells 64 (e.g., up to several dozen ATM cells 64) as they are received from the ATM physical interface 24. By accumulating ATM cells 64 in this fashion, cell loss is reduced. As the ATM cells 64 leave the FIFO buffer 48 (or while they are in the FIFO buffer 48 itself), the preamble generation logic unit 50 appends a preamble 62 to the ATM cell 64. The converter then waits for an IPG idle time 66 before completed frames 60 are sent separately to the Ethernet physical interface 18. As such, the frames 60 of FIG. 5 that are received by the Ethernet physical interface 18 comprise "shorter" Ethernet-type frames as compared to the Ethernet-type frame 52 of FIG. 4. That is, the data field is only 53 bytes long, corresponding to the size of the original ATM cell 64. The only overhead is the eight bytes in the preamble 62 because MAC header and CRC information are eliminated.

As mentioned above, the FIFO buffer 48 reduces cell loss by accumulating ATM cells 64. Because the ATM physical interface 24 is sending the ATM cells to the converter 10 at a rate of at least 155 Mbps, the buffering is used to hold the ATM cells 64, thereby allowing the slower Ethernet physical interface 18 operating at 100 Mbps to catch up to the faster data rate coming out of the ATM physical interface 24. Appropriate ATM controlling mechanisms, like constant bit rate (CBR), variable bit rate (VBR), and available bit rate (ABR), can be enabled and supported by the PCs 14 or 30 to also eliminate or reduce cell loss.

Figure 6:
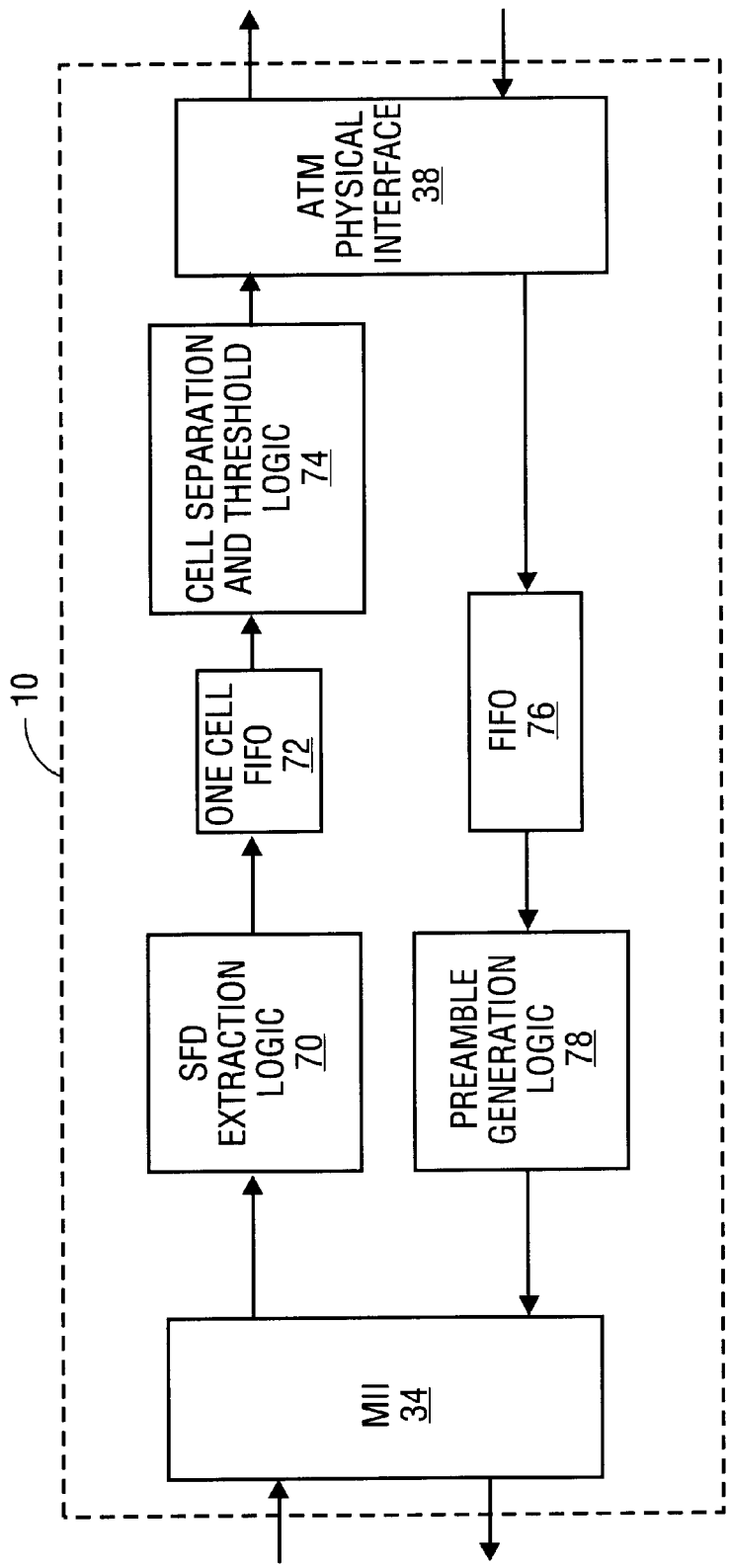
FIG. 6 shows another embodiment of a converter according to the invention that can be implemented in the network segment shown in FIG. 2.

FIG. 6 shows another embodiment of the converter 10 that can be implemented in the network segment shown in FIG. 2, where the PC 30 uses the MII interface 34. Similar to the converter 10 shown in FIG. 3, the embodiment shown in FIG. 6 includes, for the Ethernet-to-ATM communication path, a SFD unit 70, a FIFO buffer 72 coupled to the SFD unit 70, and an ATM cell separation and threshold logic unit 74 coupled to the ATM physical interface 38. For the ATM-to-Ethernet communication path, the embodiment shown in FIG. 6 further includes a FIFO buffer 76 coupled to the ATM physical interface 38. The FIFO buffer 76 is coupled to a preamble generation logic unit 78, which is in turn coupled to the MII interface 34. The FIFO buffer 72 can hold a single cell, while the FIFO buffer 76 can hold dozens of cells, for example. The components of the embodiment of the converter 10 shown in FIG. 6 functions similarly as described above for the embodiment shown in FIG. 3.

It is noted that while the embodiments of the converter 10 have been described herein as not including the Ethernet physical interface 18, the MII interface 34, or the ATM physical interfaces 26 or 40 as being part of the converter unit itself, it is possible to provide embodiments where one or more of these interfaces are part of the converter unit. Such embodiments can be used for a PC that does not have a pre-installed MII interface, for example. For instance, the embodiment of the converter 10 shown in FIG. 6 includes the MII interface 34 and the ATM physical interface 38 as part of the converter unit, although such inclusion is not necessarily required. The interfaces can be located outside of the converter 10. As such, the invention is not limited by the specific location of these various interfaces.

In summary then, embodiments of the invention provide a converter 10 that allows connection between Ethernet-type physical interfaces and ATM physical interfaces. Software in PCs 14 and 30 prepare Ethernet-type frames 52 into ATM cells for transmission to the ATM physical interface 24, via the Ethernet-to-ATM communication path. In an ATM-to-Ethernet communication path, the converter 10 transforms ATM cells 64 into shorter Ethernet-type frames 60.

An advantage of embodiments of the invention is that a PC or workstation equipped with an Ethernet controller can be connected to an ATM network. This lowers the costs associated with ATM connection because a PC does not have to be specially equipped with an expensive ATM module. Complicated Ethernet network elements such as switches, hubs, or other such devices are not needed to connect to an ATM network.

Further, embodiments of the converter 10 according to principles of the present invention allow the implementation of ATM services and ATM software, including ATM drivers, into the PC or workstation software. Also, the Quality of Service defined for ATM networks can be supported during transmission along the Ethernet-to-ATM communication path described above.

Another advantage or feature of embodiments of the invention, as evident from the description above, is that the converter 10 allows connection of a PC to an ATM network using physical layer devices of both networks and a very small piece of the MAC and ATM layers. The converter 10 receives fully prepared ATM cells from end stations (e.g., the PCs 14 and 30), extracts them from the frame 52, and sends the cells to the ATM physical interface 24. The converter 10 does not need to interfere with the higher-level layers, and a full Ethernet frame structure having MAC address fields and type/length fields is not needed. Instead, low-level frame delimiters can be used.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
    a first buffer having an input coupleable to a network interface of a first type operating at a first data rate and an output coupleable to a network interface of a second type operating at a second data rate faster than the first data rate, wherein a first frame received from the network interface of the first type does not include a media access control (MAC) address corresponding to the network interface of the first type;
    a separation unit coupled to the first buffer; and
    a second buffer having an output coupleable to the network interface of the first type and an input coupleable to the network interface of the second type, the second buffer being sized larger than the first buffer, the first buffer holding at least a portion of the first frame received from the network interface of the first type and the separation unit sending the portion of the first frame to the network interface of the second type at a data rate corresponding to the second data rate, the second buffer holding a second frame received from the network interface of the second type and sending the second frame to the network interface of the first type at a data rate corresponding to the first data rate.

2. The apparatus of claim 1 wherein the network interface of the second type comprises an asynchronous transfer mode physical interface.

3. The apparatus of claim 1 wherein the network interface of the first type comprises an Ethernet physical interface.

4. The apparatus of claim 1, further comprising a preamble generation unit coupled to the second buffer, the preamble generation unit appending a preamble to the second frame before the second frame is sent to the network interface of the first type.

5. The apparatus of claim 1, further comprising a start frame delimiter (SFD) unit coupled between the network interface of the first type and the first buffer, the SFD unit detecting a start of the portion of the first frame.

6. The apparatus of claim 1 wherein the first frame comprises a plurality of bytes of data, the separation unit counting the plurality of bytes and sending the portion of the first frame to the network interface of the second type if the plurality of bytes reaches a predefined threshold.

7. The apparatus of claim 1 wherein the second buffer is sized to hold a plurality of frames having the same size as the second frame, the second buffer receiving the plurality of frames at a data rate corresponding to the second data rate, the second buffer holding the plurality of frames and subsequently separately sending each frame to the network interface of the first type at the data rate corresponding to the first data rate.

8. The apparatus of claim 1 wherein the first buffer is sized to hold a portion of the first frame, the portion of the first frame exiting the first buffer as other portions of the first frame enter the first buffer.

9. The apparatus of claim 1 wherein the first frame received from the network interface of the first type includes a data field formatted into one or more cells corresponding to a format of the network interface of the second type, the separation unit extracting the formatted cells from the data field and causing the formatted cells to be sent to the network interface of the second type.

10. A network segment, comprising:
    a node having a microprocessor;
    a network interface of a first type coupled to the microprocessor, the network interface of the first type operating at a first data rate;
    a first buffer having an input coupled to the network interface of the first type and an output coupleable to a network interface of a second type operating at a second data rate faster than the first data rate, wherein a first frame received from the network interface of the first type does not include a media access control (MAC) address corresponding to the network interface of the first type;
    a separation unit coupled to the first buffer; and
    a second buffer having an output coupleable to the network interface of the first type and an input coupleable to the network interface of the second type, the second buffer being sized larger than the first buffer, the first buffer holding at least a portion of the first frame received from the network interface of the first type and the separation unit sending the portion of the first frame to the network interface of the second type at a data rate corresponding to the second data rate, the second buffer holding a second frame received from the network interface of the second type and sending the second frame to the network interface of the first type at a data rate corresponding to the first data rate.

11. The network segment of claim 10 wherein the node comprises a computer.

12. The network segment of claim 10 wherein the network interface of the first type comprises a type of Ethernet interface.

13. The network segment of claim 10 wherein the network interface of the second type comprises an asynchronous transfer mode interface.

14. The network segment of claim 10 wherein the first frame received from the network interface of the first type includes a data field formatted into one or more cells corresponding to a format of the network interface of the second type, the first frame being formatted by a set of instructions in the node, the separation unit extracting the formatted cells from the data field and causing the formatted cells to be sent to the network interface of the second type.

15. The network segment of claim 10 wherein the first buffer is sized to hold a portion of the first frame, the portion of the first frame exiting the first buffer as other portions of the first frame enter the first buffer.

16. A method, comprising:
   formatting a first frame at a node coupled to a network interface of a first type according to a first format corresponding the network interface of the first type, wherein the first format does not include a media access control (MAC) address;
   formatting a portion of the first frame at the node according to a second format corresponding to a network interface of a second type;
   sending the formatted first frame to a first buffer at a first data rate corresponding to the network interface of the first type;
   holding the portion of the first frame in the first buffer and sending the portion to a network interface of the second type at a second data rate corresponding to the network interface of the second type;
   sending a second frame from the network interface of the second type at the second data rate, the second frame having the second format;
   receiving second frame from the network interface in a second buffer;
   formatting the second frame according to the first format and sending the second frame to the network interface of the first type at the data rate corresponding to the network interface of the first type.

17. The method of claim 16, further comprising:
   predefining a threshold associated with bytes of data sent to the first buffer;
   delaying sending the portion of the first frame to the network interface of the second type until the threshold is reached.

18. The method of claim 16, further comprising:
   receiving a plurality of second frames in the second buffer;
   appending a preamble to each of the second frames; and
   separately sending the second frames from the second buffer to the network interface of the first type.

19. The method of claim 16 wherein the network interface of the first type comprises a type of Ethernet interface and wherein the network interface of the second type comprises an asynchronous transfer mode interface.

20. A machine-readable medium having stored thereon instructions, which when executed by a processor, cause the processor to perform the following:
   format a frame according to a first format corresponding an Ethernet-type network interface coupled to the processor, the frame according to the first format having a data field and no media access control (MAC) address;
   partition the data field of the frame into at least one cell having a second format corresponding to an asynchronous transfer mode interface;
   provide the at least one cell with a first field associated with virtual path and virtual channel identifiers and a second field associated with data;
   match virtual path and virtual channel identifiers with a destination of the frame;
   insert the virtual path and virtual channel identifiers into the first field of the at least one cell;
   signal a connection to the destination; and
   send the formatted frame to a buffer at a data rate corresponding to the Ethernet-type network interface if a connection set-up signal from the destination is received by the processor.

21. A machine-readable medium of claim 20 wherein the instructions further cause the processor to perform the following:
   partition the data field into a plurality of cells;
   provide each of the plurality of cells in the data field with first fields associated with virtual path and virtual channel identifiers and second fields associated with data;
   insert the virtual path and virtual channel identifiers into the first field of each of the plurality of cells;
   insert address information into the frame if the destination is located outside of a network coupled to the asynchronous transfer mode interface.

* * * * *